United States Patent [19]

Gallatin

[11] Patent Number: 4,949,987
[45] Date of Patent: * Aug. 21, 1990

[54] ASYMMETRICAL FOUR-BAR TRAILER HITCH

[76] Inventor: Norman W. Gallatin, P.O. Box 120, Garrison, Iowa 52229

[*] Notice: The portion of the term of this patent subsequent to Jul. 8, 2003 has been disclaimed.

[21] Appl. No.: 178,991
[22] PCT Filed: Jul. 9, 1986
[86] PCT No.: PCT/US86/01431
§ 371 Date: Mar. 27, 1987
§ 102(e) Date: Mar. 27, 1987
[87] PCT Pub. No.: WO88/00149
PCT Pub. Date: Jan. 14, 1988

Related U.S. Application Data

[63] Continuation-in-part of Ser. No. 428,537, Sep. 30, 1982, Pat. No. 4,598,926.

[51] Int. Cl.⁵ .............................................. B62D 53/00
[52] U.S. Cl. ................................. 280/459; 280/446.1; 280/456.1; 280/461.1
[58] Field of Search ................... 280/459, 461.1, 460.1, 280/446.1, 455.1, 456.1

[56] References Cited

U.S. PATENT DOCUMENTS

| | | | |
|---|---|---|---|
| 2,444,944 | 7/1948 | Minter | 280/456 R |
| 3,105,705 | 10/1963 | Richard | 280/406.1 X |
| 3,787,068 | 1/1974 | Miller | 280/456 R X |
| 3,790,191 | 2/1974 | Gallatin | 280/456 R |
| 4,106,794 | 8/1978 | Sallis | 280/456 R |
| 4,598,926 | 7/1986 | Gallatin | 280/459 |

FOREIGN PATENT DOCUMENTS

| | | | |
|---|---|---|---|
| 556290 | 9/1943 | United Kingdom | |
| 1167773 | 10/1969 | United Kingdom | 280/446 B |
| 88/00149 | 1/1988 | World Int. Prop. O. | 280/459 |

Primary Examiner—Mitchell J. Hill
Attorney, Agent, or Firm—Beveridge, DeGrandi & Weilacher

[57] ABSTRACT

A tow vehicle (3) and trailer vehicle (5) are connected by a four-bar hitch which has one arm (1) aligned longitudinally with the central longitudinal axes (12,13) of the vehicles, and a steering arm (6) which is laterally spaced from the main arm. Pivots, (7,8) at the front and rear ends of the steering arm are forwardly offset with respect to the corresponding pivots (2,4') of the main arm. The length of the main arm is no greater than about 1.5 times the length of the steering arm. The rear pivot (8) of the steering arm is offset laterally and forwardly from the rear pivot (4') of the main arm, so that the lateral offset is greater than the forward offset. An embodiment is disclosed wherein the forward pivot on the steering arm is laterally shiftable toward the forward pivot on the main arm to reduce the offtracking of the trailer for certain maneuvering and driving situations. In one embodiment, an upper arm (30) is disposed above and in forwardly convergent relation with respect to the main arm (1) in order to provide a vertical four-bar linkage which allows the tow vehicle to pitch naturally.

21 Claims, 3 Drawing Sheets

ASYMMETRICAL FOUR-BAR TRAILER HITCH

RELATED APPLICATION

This is a Continuation-in-Part of application Ser. No. 428,537, filed Sept. 30, 1982, now U.S. Pat. No. 4,598,926.

BACKGROUND OF THE INVENTION

This invention relates to a four-bar trailer hitch.

Heretofore, there have been numerous proposals for four-bar trailer hitches, and it has been recognized in the art that these can provide certain advantages in the stability and control of articulated road vehicles. One reason for this is that, by providing two forwardly convergent arms, the instantaneous center of rotation, referred to in the art as the ICR, is moved forwardly toward the vicinity of the rear axle of the tow vehicle. The following United States patents disclose four-bar trailer hitches which are symmetrical with respect to the centerlines of the towing and towed vehicles:
Minter: U.S. Pat. No. 2,444,944
Gallatin: U.S. Pat No. 3,790,190
Miller: U.S. Pat. No. 3,787,068
Hinkley: U.S. Pat. No. 4,019,754
Sallis: U.S. Pat. No 4,106,794.

Darvill's British specification No. 556,290 discloses a four-bar hitch which is asymmetrical with respect to the vehicles, but its purpose is for pulling farm machinery such as reapers which are relatively light, slow and are turned in only one direction. The off-center link of the Darvill hitch is shifted between the right and left side of the mechanism, depending on which direction the tractor will turn when working a field.

One object of the present invention is to provide a four-bar hitch which is more readily adaptable to existing vehicle structures than the four-bar hitches of symmetrical construction, inasmuch as the invention may utilize existing coupling structures which are located on the centerlines of the respective vehicles. Another object of the invention is to provide a four-bar hitch which is lighter and less expensive than many four-bar hitches which have been proposed, this attribute being due in part to the fact that the second link which performs a steering function has strength requirements which are less than the strength required of both links in a symmetrical four-bar hitch.

Another object of the invention is to provide a four-bar hitch which is more easily hooked up between the vehicles than most previous designs which have been proposed or produced.

Still another object is to provide a hitch system which, under extreme maneuvering conditions, makes it possible to make very sharp turning angles without interference between the two links of the hitch.

A further object of the invention is to provide a hitch which has a laterally shiftable coupling which enables the vehicle operator conveniently to convert the hitch from a four-bar mode of operation at highway speeds to a simpler arrangement more closely resembling a single pivot for maneuvering and driving the vehicle at lower speeds where stability is of less concern.

One embodiment of the invention has the further object of providing a supplemental vertical asymmetrical four-bar linkage which performs a load transferring function while permitting the vehicles to pitch relative to each other.

Other features and attributes of the invention will be appreciated by those skilled in the art after reading the remainder of this specification.

SUMMARY OF THE INVENTION

This invention pertains to a four-bar hitch which has a main arm and a steering arm for pulling one vehicle behind another vehicle. The main arm has a first pivot at its forward end and a second pivot at its rear end. The steering arm has a third pivot at its forward end and a fourth pivot at its rear end. In plan view, these four pivots define the four corners of a quadrilateral linkage which is asymmetrical with respect to the aligned longitudinal axes of the connected vehicles. The first and third pivots are spaced apart a distance which is less than the distance between the second and fourth pivots, and the first and second pivots are spaced apart a distance which is no more than about 1.5 times the distance between the third and fourth pivots. The hitch may include a pivot-shifting mechanism for moving the third pivot toward the first pivot to reduce the steering of the trailer by the steering hitch member. Also, the hitch may have an upper arm which is disposed above the main arm to provide a vertically disposed four-bar linkage to transfer weight from the trailer to the tow vehicle while allowing the tow vehicle to pitch naturally.

Preferably, the first and second pivots lie on the horizontal centerlines of the tow vehicle and trailer, respectively. The fourth pivot is more forward than the second pivot, and the third pivot is more forward than the first pivot. The fourth pivot is laterally and forwardly offset from the third pivot and, in this relationship, the lateral offset is greater than the forward offset. The main arm has greater strength in tension, compression and flexion than the steering arm. In some embodiments, the first and second pivots are torque-transmitting means so that the main arm provides roll coupling between the tow vehicle and the trailer. One of the pivots on the main arm may be a hinge joint which permits the main arm to swing horizontally but not vertically relative to the respective vehicle. Another one of the pivot means on the main arm may be a universal joint or similar connection which is operable to prevent twisting movement of the main arm relative to the connected vehicle while also permitting vertical and horizontal swinging movement of the main arm relative to the connected vehicle.

It will be understood that the invention may take a large variety of forms, and that it is not limited only to the embodiments disclosed in this specification.

DETAILED DESCRIPTION

This description includes a first part describing the physical structure of several embodiments of the invention, followed by a second part which describe their operation and function.

Physical Structure

Figure 1:
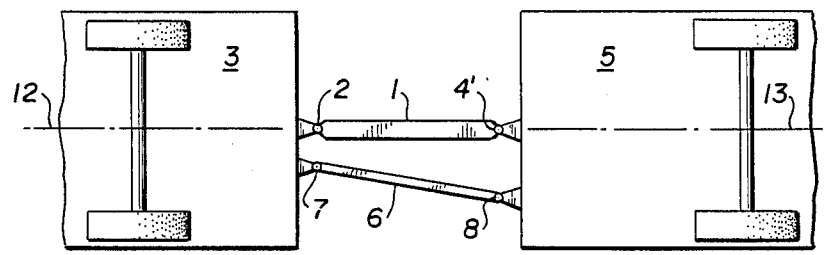
FIG. 1 is a plan view of one embodiment of the invention.

Referring to FIG. 1, it can be seen that the main arm 1 is substantially on the longitudinal centerlines 12 and 13 of the towing vehicle 3 and trailer 5. Ball connection means 2 at the forward end of the main arm 1 is securely attached to the rear of the towing vehicle 3 at its centerline 12. The rear end of main arm 1 has a vertical hinge joint 4' connected to the front of the trailer 5. As used in this specification, the term "hinge joint" refers to a connection having a vertical pivot axis which permits an arm to swing horizontally but not vertically. A steering arm 6 is in laterally spaced relation to the main arm 1. The forward end of the steering arm 6 is connected by ball connection means 7 to the rear end of the towing vehicle 3 at a point which is laterally spaced from the centerline 13 of the towing vehicle 3. At the rear of the steering arm 6, a ball connection means 8 is securely attached to the trailer 5 at a position which lies at a greater distance from the trailer centerline 13 than the distance of ball connection means 7 from centerline 12.

Figure 2:
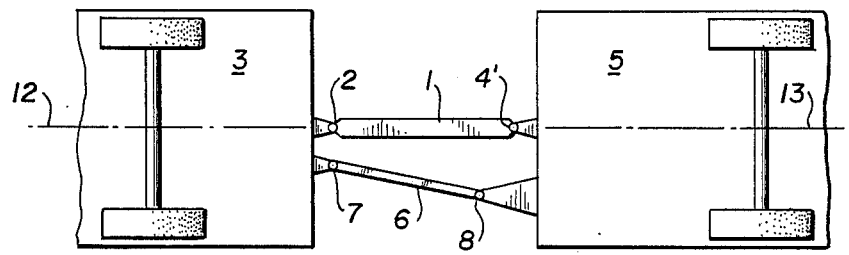
FIG. 2 is a simplified plan view of a second embodiment of the invention wherein the pivot axes of the steering arm are forwardly offset with respect to the corresponding pivot axes of the main towing arm.

FIG. 2 shows a second embodiment of the invention provided with a main arm 1 and pivotal connections 2 and 4 which are similar to the corresponding components in FIG. 1. Steering arm 6 is similar to the equivalent structure shown in FIG. 1 except that the pivotal connections 7 and 8 in FIG. 2 are located forwardly of the positions of the pivotal connections 2 and 4 of main arm 1.

Figure 3:
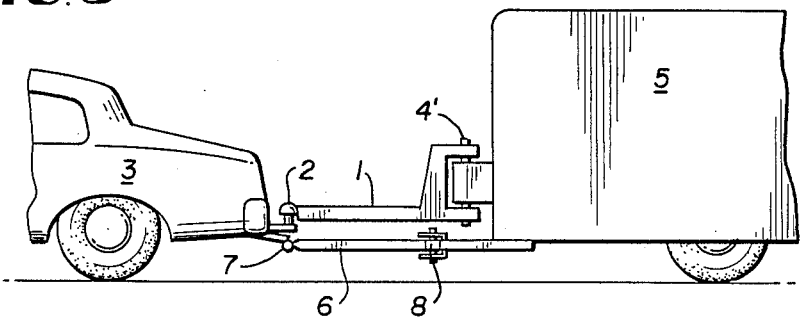
FIG. 3 is a side elevation view of the hitch mechanism of FIG. 2, illustrating the hinge joint at the rear end of the main arm, and an exaggerated vertical spacing between the main arm and the steering arm.

FIG. 3 is an elevational view of the FIG. 2 embodiment. It, too, shows the main arm 1 connected at the front by ball coupler means 2 or the like to appropriate structure secured to the rear end of a tow vehicle 3. The rearward end of main arm 1 is shown here with a vertical hinge connection means 4' suitably attached to the trailer 5. The ends of the steering arm 6 is attached to the tow vehicle and trailer by ball coupler means 7 and 8. For illustrative purposes, the vertical distance between the main arm 1 and the steering arm 6 is exaggerated in FIG. 3, but it should be noted that ball coupler means 7 and the body of the steering arm 6 are at an elevation below the rear body structure of the tow vehicle 3 and below the ball coupler means 2 and the body of the main arm 1.

Figure 4:
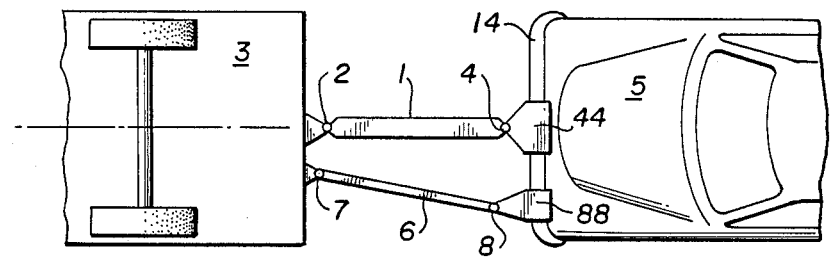
FIG. 4 is a plan view of an embodiment of the invention wherein an automobile is the trailer vehicle, and all pivots are formed by ball couplings.
Figure 5:
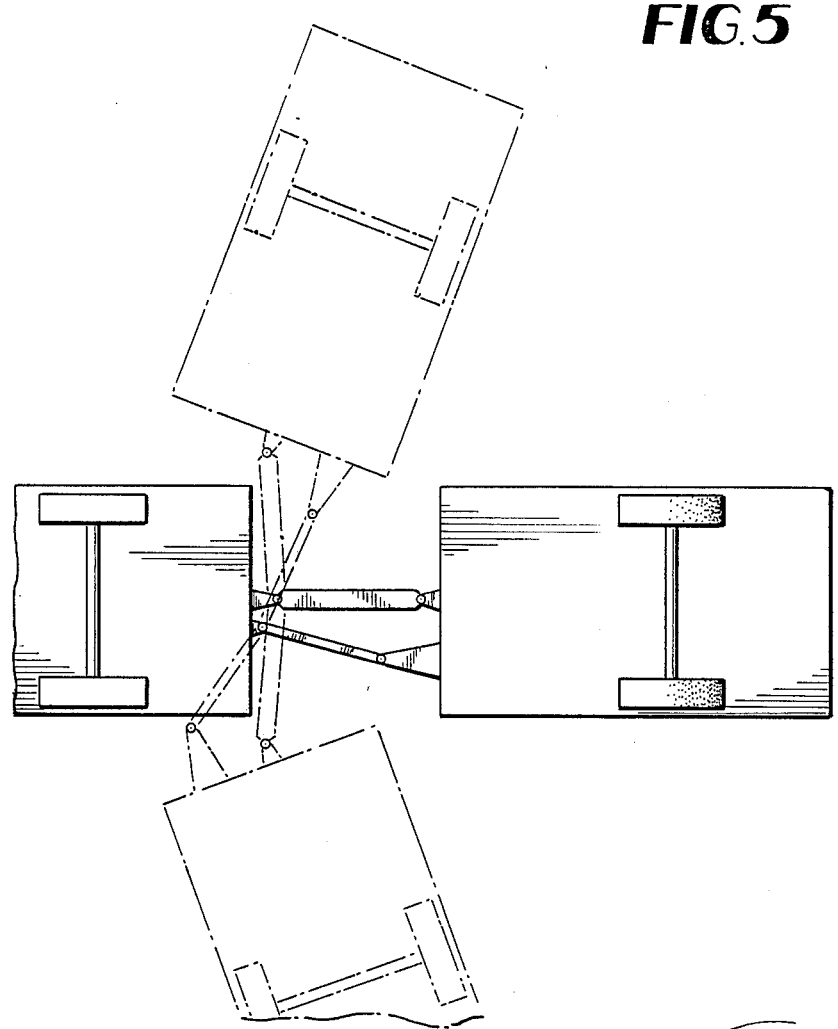
FIG. 5 is a plan view which illustrates the positioning of the hitch arms when the trailer is at different positions.

FIG. 4 shows an embodiment in which the trailer is an automobile. As in the previously-described embodiments, a towing vehicle 3 is connected to the towed vehicle 5 by an arm 1 which has a ball connection means 2 at its forward end. However, in FIG. 4, the rear end of the main arm 1 is provided with a ball connection 4 rather than a hinge connection 4'. The ball connection means 4 is attached by support structure 44 to the front bumper 14 or other suitable structure of the towed vehicle 5. The steering arm 6 has its front end attached by ball coupler means 7 or the like to the rear end of the towing vehicle 3. The rear end of the steering arm 6 is connected by a ball connection 8 to a support structure 88 affixed to the front bumper 14 of the towed vehicle 5.

Figure 6:
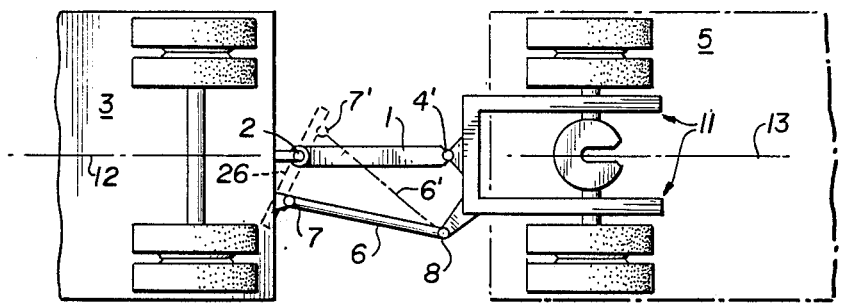
FIG. 6 shows the invention applied to a converter dolly trailer. This embodiment also is constructed to shift one of the pivots to change the steering characteristics of the hitch.

FIG. 6 shows a converter dolly 11 which is the trailer. It is connected to the tow vehicle 3 by a hitch constructed according to the invention. Again, the main arm 1 lies substantially on the centerlines 12 and 13. Its forward end is connected to the rear end of the towing vehicle 3 by draft hook and eye 2'. A hinge connection means 4' connects the rear end of the main arm 1 to the frame of the converter dolly 11. As in FIG. 1, the steering arm 6 is laterally offset from the main arm 1. The forward end of the steering arm 6 is securely attached by ball connection means 7 to the rear end of the towing vehicle 3 at a point spaced laterally from the centerline 12. The rear end of the steering arm 6 is attached by ball connection means 8 to the frame of the converter dolly 11, and this connection lies at a greater distance from the centerline 13 than the ball connection means 7 is from the centerline 12.

The embodiment of FIG. 6 also can have a pivot-shifting feature which modifies the hitch geometry under certain circumstances. As shown in FIG. 6, the coupling ball is shiftable from the position 7 to the position 7' so that the steering arm will occupy the position 6' shown in broken lines. When shifted to this position at low vehicle speeds, the maneuvering characteristics of the vehicle are similar to those in existing dollies because the shifting reduces the steering effect of the steering arm on the trailer. Specifically, this reduces the "offtracking" which is the amount the trailer path deviates from the path of the tow vehicle.

Figure 7:
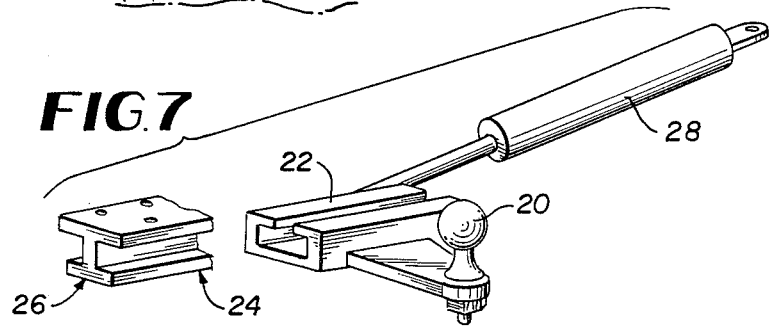
FIG. 7 is a fragmentary perspective view of a pivot-shifting mechanism suitable for use in the apparatus of FIG. 6.

A suitable mechanism for shifting the pivot 7 is shown in FIG. 7 where it will be seen that the ball 20 of the coupling 7 is mounted on a U-shaped slide 22. The slide is supported on a track 24 which is the lower flange of an I-beam 26, most of which is broken away in FIG. 7. The upper flange of I-beam 26 is provided with holes for receiving bolts which support the slide at the rear of the tow vehicle so that the track 24 is at the position shown in broken lines in FIG. 6. It is also possible to mount the entire mechanism beneath an extension bumper which carries the pivot 2 and has an upper horizontal surface positioned coplanar with the floor of the towing vehicle.

The slide 22 and ball 20 are moved along the track 24 by a hydraulic or pneumatic cylinder 28 which has its rod connected to the slide 22. The cylinder can be controlled automatically, in response to signals from vehicle speed sensing mechanisms, or it may be controlled from a panel in the cab provided with switches and visual indicators. Preferably, the mechanism will include latches for retaining the slide 22 securely when the connection 7 is in each of the positions illustrated in FIG. 6.

Figure 8:
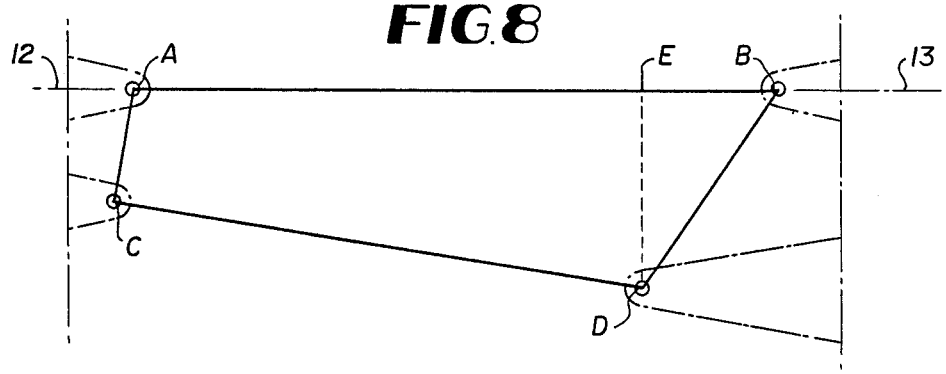
FIG. 8, is a diagrammatic view illustrating the angles and proportions of a trailer hitch constructed according to the invention.

The functional geometry of the hitch mechanisms described above is shown in simplified plan view in FIG. 8 where it will be seen that pivot axes A, B, C and D define four corners of a four bar linkage which is asymmetrical with respect to the axis 12 of the tow vehicle when the axes 12 and 13 are parallel. Points A and B graphically represent the connections 2 and 4 at the forward and rear ends, respectively, of the main arm 1 in FIGS. 1-6. Points C and D are third and fourth pivots which represent the connections at the forward and rear ends of the steering arms 6. The main arm has an effective length AB, and the steering arm has an effective length CD. To provide acceptable characteristics at highway speeds, the distance AB should be no more than 1.5 times the distance CD. AB should be no less than about 0.7 times CD. The other two "links" AC and BD are on the tow vehicle and trailer, respectively, and the length AC is less than the length BD. Pivot A lies on the longitudinal centerline 12 of the tow vehicle and pivot B lies on the longitudinal centerline 13 of the trailer. When the centerlines 12 and 13 are parallel as shown in FIG. 8, the angle ABD is greater than 45 degrees. The rear pivots B and D are positioned so that the pivot D has a lateral offset distance ED which is greater than its forward offset distance BD.

Figure 9:
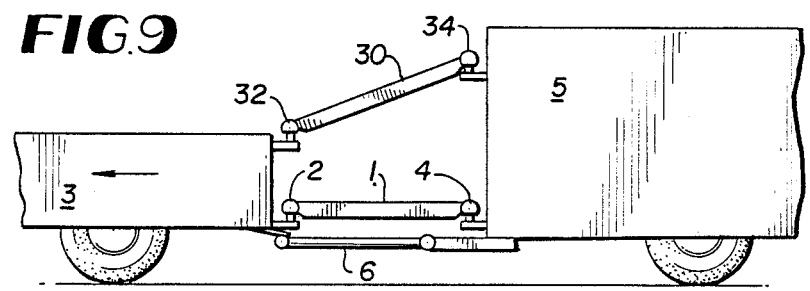
FIG. 9 is a side elevational view of a further embodiment of the invention wherein there is a third arm which is vertically aligned with the main arm and is operable to permit relative pitching movement between the vehicles while still permitting a portion of the trailer load to be borne by the tow vehicle.

A modified version of the invention is shown in FIG. 9, wherein ball couplings are provided at both ends of the main arm 1, the steering arm 6 and an auxiliary arm 30. The auxiliary arm 30 is normally located in the same vertical plane as the main arm 1. The ball coupling 32 at the forward end of auxiliary arm 30 provides the hitch with a fifth pivot means, and ball coupling 34 is a sixth pivot means which is at the rear end of arm 30. The lengths, locations and proportions of the arms 1 and 6 correspond to the FIG. 2 embodiment to provide similar steering control of the trailer. As can be seen in FIG. 9, the arms 1 and 30 provide a vertical four bar linkage in which the distance from pivot 2 to pivot 32 is less than the distance from pivot 4 to pivot 34. This arrangement serves to transfer weight from the trailer to the tow vehicle while allowing the tow vehicle to pitch naturally.

Figure 10:
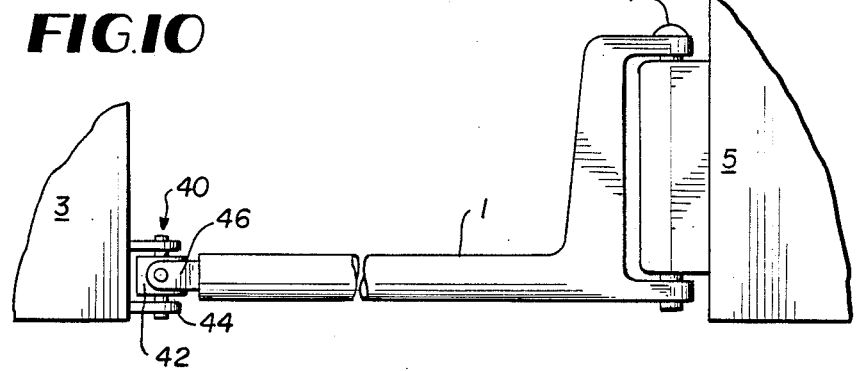
FIG. 10 is a fragmentary view of a modified form of main arm which is used to provide roll coupling between a tow vehicle and a trailer vehicle.

Another modification of the main arm 1, shown in FIG. 10, is used in vehicles where roll coupling between the tow vehicle and the trailer is desired. The particular arrangement shown in FIG. 10 can be used in lieu of the main arms described above. It has a universal joint 40 connecting its forward end to the tow vehicle, and a vertical hinge joint 4 connecting its rear end to the trailer 5. The universal joint is conventional in that it has a crosspiece 42 pivotally connected to stirrups 44 and 46 which are affixed to the tow vehicle and the main arm, respectively. Alternately, a fifth wheel type device may be mounted on the tow vehicle and engaged by the forward end of the main arm to provide a universal joint. In either case, the forward pivot will permit vertical and horizontal swinging movement of the main arm relative to the vehicle 3, while preventing twisting movement of the main arm relative to the vehicle 3.

It is believed that the principal applications of this invention will be in connection with large heavy duty trucks which are designed to travel on highways at speeds of at least 50 miles per hour where stability becomes an important factor. Vehicles are considered to be large trucks when the load-carrying body has a length of at least 25 feet and a gross weight of at least 10 tons.

The term "pivot means" as used in this specification and claims is intended to embrace a wide variety of devices including ball-and-socket couplings of the type customarily used in trailer hitches, hinge connections which allow horizontal swinging movement while preventing vertical swinging movement, and universal joints which permit both vertical and horizontal swinging movement but not twisting movement relative to the connected vehicles. A "fifth wheel" is one example of universal joints within this definition. The terms "tow vehicle" and "trailer vehicle" are also intended to be embracing of any two vehicles, one of which is towed by the other. While the two vehicle will normally have an engine or other propulsion means, it may be powerless as is the case in the midsection of a three-part articulated truck. The trailer vehicle may be a conventional semitrailer, or it can be anything which is towed such as in automobile, a converter dolly, or a self-supporting trailer with four wheel sets and a non-detachable turnable front axle. In the latter type of vehicle, the joint at the rear end of the main arm can be a universal joint or a ball joint rather than a hinge joint.

Persons familiar with the field of the invention will recognize that it may take many forms other than those disclosed herein. With this in mind, it is emphasized that the invention is not limited only to the disclosed embodiments but is embracing of a wide variety of vehicles and hitch mechanisms which fall within the spirit of the following claims.

I claim:

1. A four-bar hitch for pulling a trailer vehicle behind a two vehicle, said tow vehicle having a rear end and a longitudinal axis, said trailer having a longitudinal axis and a forward end which is connected by said hitch to the rear end of the tow vehicle, said four-bar hitch having a main arm and a steering arm, said main arm having a first pivot means connecting a forward portion thereof to the rear end of the tow vehicle and a second pivot means connecting a rear portion thereof to the forward end of the trailer, said steering arm being spaced laterally from said main arm and having a third pivot means connecting a forward portion of the steering arm to the rear end of the tow vehicle, said steering arm having a fourth pivot means connecting a rear portion thereof to the forward end of the trailer, said main arm being substantially parallel to the longitudinal axes of the tow vehicle and the trailer when the longitudinal axis of the trailer is parallel to the longitudinal axis of the tow vehicle, said arms and said vehicle comprising a quadrilateral linkage, four corners of which are defined in plan view by said first, second, third and fourth pivot means, said quadrilateral linkage being asymmetrical with respect to the longitudinal axis of the tow vehicle when the longitudinal axis of the trailer is parallel to the longitudinal axis of the tow vehicle, said first and third pivot means being spaced apart a distance which is less than the distance between the second and fourth pivot means, said first and second pivot means being spaced apart a distance which is from about 0.7 to 1.5 times the distance between the third and fourth pivot means.

2. A four-bar hitch according to claim 1 wherein the first and second pivot means are torque-transmitting pivot means which, via the main arm, provide roll coupling between the tow vehicle and the trailer.

3. A four-bar hitch according to claim 1 wherein the main arm and the steering arm are at different elevations and are arranged so that one of said arms is able to move beneath the other said arm when the longitudinal axis of the trailer is turned relative to the longitudinal axis of the tow vehicle.

4. A four-bar hitch according to claim 1 wherein the fourth pivot means is more forward than the second pivot means.

5. A four-bar hitch according to claim 1 wherein the third pivot means is more forward than the first pivot means.

6. A four-bar hitch according to claim 1 wherein the main arm has greater strength in tension, compression and flexion than the steering arm.

7. A four-bar hitch according to claim 1 wherein the first pivot means is operable to prevent twisting movement of the main arm relative to the tow vehicle, said first pivot means also being operable to permit vertical and horizontal swinging movement of the main arm relative to the tow vehicle.

8. A four bar hitch according to claim 7 wherein the second pivot means is a hinge joint which permits the main arm to swing horizontally but not vertically relative to the trailer.

9. A four-bar hitch according to claim 1 wherein one of the first and second pivot means on the main arm is a hinge joint which permits the main arm to swing horizontally but not vertically relative to the respective vehicle.

10. A four-bar hitch according to claim 9 wherein another one of said first and second pivot means on the main arm is operable to prevent twisting movement of the main arm relative to the tow vehicle and is also operable to permit vertical and horizontal swinging movement of the main arm relative to the respective vehicle.

11. A four-bar hitch according to claim 1 wherein said fourth pivot has a lateral offset and a forward offset relative to the second pivot, said lateral offset being greater than the forward offset.

12. A four-bar hitch according to claim 1 having
pivot shifting means for moving the third pivot means toward the first pivot means to reduce the steering of the trailer by the steering arm.

13. A four-bar hitch according to claim 12 wherein the first and second pivot means are torque-transmitting pivot means which, via the main arm, provide roll coupling between the tow vehicle and the trailer.

14. A four-bar hitch according to claim 12 wherein the main arm and the steering arm are at different elevations and are arranged so that one of said arms is able to move beneath the other said arm when the longitudinal axis of the trailer is turned relative to the longitudinal axis of the tow vehicle.

15. A four-bar hitch according to claim 12 wherein the fourth pivot means is more forward than the second pivot means.

16. A four-bar hitch according to claim 12 wherein said fourth pivot is laterally and forwardly offset from the second pivot, said lateral offset being greater than the forward offset.

17. A four-bar hitch according to claim 1 wherein
said four-bar hitch has additionally an upper arm which is disposed above said main arm, said upper arm having a fifth pivot means which is disposed above said main arm, said upper arm having a fifth pivot means connecting a forward portion thereof to the rear end of the tow vehicle and a sixth pivot means connecting a rear portion thereof to the forward end of the trailer to provide a vertical four-bar linkage which allows the tow vehicle to pitch naturally.

18. A four-bar hitch according to claim 17 wherein the main arm and the steering arm are at different elevations and are arranged so that one of said arms is able to move beneath the other said arm when the longitudinal axis of the trailer is turned relative to the longitudinal axis of the tow vehicle.

19. A four-bar hitch according to claim 17 wherein the fourth pivot means is more forward than the second pivot means.

20. A four-bar hitch according to claim 17 wherein said fourth pivot is laterally forwardly offset from the second pivot, said lateral offset being greater than the forward offset.

21. A four-bar hitch according to claim 1 having
pivot shifting means for moving the third pivot means toward the first pivot means to reduce the steering of the trailer by the steering arm,
said four-bar hitch having additionally an upper arm which is disposed above said main arm, said upper arm having a fifth pivot means which is disposed above said main arm, said upper arm having a fifth pivot means connecting a forward portion thereof to the rear end of the tow vehicle and a sixth pivot means connecting a rear portion thereof to the forward end of the trailer to provide a vertical four-bar linkage which allows the tow vehicle to pitch naturally.

* * * * *